United States Patent [19]

Orywol et al.

[11] Patent Number: 4,720,519
[45] Date of Patent: Jan. 19, 1988

[54] PROCESS FOR THE PRODUCTION OF NON-FOAMED MOLDINGS

[75] Inventors: Wilfried Orywol, Overath; Fritz Ehrhard, Neuss; Walter Uerdingen, Leverkusen, all of Fed. Rep. of Germany

[73] Assignee: Bayer Aktiengesellschaft, Leverkusen, Fed. Rep. of Germany

[21] Appl. No.: 832,956

[22] Filed: Feb. 26, 1986

[30] Foreign Application Priority Data

Mar. 2, 1985 [DE] Fed. Rep. of Germany ....... 3507374

[51] Int. Cl.$^4$ .................................................. C08K 9/12
[52] U.S. Cl. ..................... 524/450; 524/871; 528/57
[58] Field of Search ............... 264/216; 524/450, 871; 528/57

[56] References Cited

U.S. PATENT DOCUMENTS

| | | | |
|---|---|---|---|
| 2,785,150 | 3/1957 | Kreider et al. | 260/75 |
| 3,271,352 | 9/1966 | Weinberg | 524/450 |
| 3,326,844 | 6/1967 | Gruber | 524/450 |
| 3,755,222 | 8/1973 | Gruker et al. | 524/450 |
| 4,251,427 | 2/1981 | Recker et al. | 528/58 |
| 4,251,428 | 2/1981 | Recker et al. | 528/57 |
| 4,336,180 | 1/1982 | Recker et al. | 524/454 |
| 4,551,498 | 11/1985 | Yeater et al. | 524/871 |

FOREIGN PATENT DOCUMENTS 2651400  5/1978  Fed. Rep. of Germany .

OTHER PUBLICATIONS

Polyurethane Handbook-pp. 388–402, Gunter Oertel, Editor, Hanser Pub., NY, (1983).
Kunststoff-Handbuch, vol. VII, "Polyurethane" by Becker/Braun, Carl Hanser Verlag, Munich/Vienna (1983), pp. 410 to 425.

*Primary Examiner*—Veronica P. Hoke
*Attorney, Agent, or Firm*—Gene Harsh; Joseph C. Gil; Lyndanne M. Whalen

[57] ABSTRACT

Urea-modified bubble-free moldings based on polyisocyanate polyaddition products are made by reacting (a) an organic polyisocyanate with (b) a polyhydroxyl compound and/or polyepoxide in the presence of (c) a water chain extender in the form of an aqueous alkali aluminosilicate or an aqueous alkali-alkaline earth aluminosilicate of the zeolite type in a mold using cast resin technology. The reaction components are used in quantities such that the equivalent ratio of isocyanate to hydroxyl and/or epoxide groups is from 1.1:1 to 6.1. The chain extender is used in a quantity such that the amount of water is at least equivalent to the excess of isocyanate. These moldings may be made by a one-shot or a two-shot process. These moldings are characterized by better mechanical properties such as tensile strength and elongation than prior art moldings.

6 Claims, No Drawings

PROCESS FOR THE PRODUCTION OF NON-FOAMED MOLDINGS

BACKGROUND OF THE INVENTION

This invention relates to a process for the production of non-foamed moldings using cast-resin technology.

The production of cast-resins, for example for the electrical field, by reaction of organic polyisocyanates with polyhydroxyl compounds is already known (see, for example, Kunststoff-Handbuch, Vol. VII, "Polyurethane" by Becker/Braun, Carl Hanser Verlag, Munich/Vienna (1983), pages 410 to 425). Such moldings used in the electrical industry, for example as insulators, must be bubble-free and foam-free. Consequently, the prior art teaches that careful degassing and drying of the starting materials, particularly the polyhydroxyl compounds is important. In general, water-absorbing agents such as (anhydrous) zeolites, are added to such reaction mixtures to prevent bubble formation caused by reaction of isocyanate groups with water which reaction is accompanied by the elimination of carbon dioxide.

It is also known that the incorporation of urea groups in polyurethane plastics generally leads to an improvement in their mechanical properties. Urea groups may be incorporated in polyurethanes by using either diamines or water as a reactant for the isocyanate groups. However, diamines cannot be used in the production of plastics by cast-resin technology because diamines are so highly reactive to isocyanate groups that reaction systems containing diamines cannot be processed as cast-resins. Reaction systems containing polyisocyanates, polyhydroxyl compounds and diamines cannot be processed as cast-resins in one-step because the different reactivity of the amino and hydroxyl groups to isocyanate groups would lead to inhomogeneous reaction products. The use of water, however, appeared extremely inappropriate for the reasons explained above but particularly because the presence of water would give rise to unacceptable bubble formation.

However, it has now surprisingly been found that urea groups may readily be incorporated even in bubble-free polyisocyanate-based moldings produced using cast-resin technology by using water provided the water is incorporated in the reaction mixture in the form of certain aqueous zeolites.

SUMMARY OF THE INVENTION

The process of the present invention makes it possible to produce urea-modified bubble-free moldings based on polyisocyanate polyaddition products using cast-resin technology. It is therefore possible, in the case of elastic moldings, to obtain better tensile strength and better elongation. In the case of crosslinked moldings, better thermal stability under load, higher flexural strength and improved impact strength are obtained than with corresponding, urea-free moldings.

These and other advantages which will be apparent to those skilled in the art are accomplished by reacting an organic polyisocyanate with an organic polyhydroxyl compound and/or a polyepoxide in the presence of a chain extender. The chain extender is in the form of an aqueous alkali aluminosilicate or an aqueous alkali-alkaline earth aluminosilicate of the zeolite type. The polyisocyanate and polyhydroxyl compound and/or polyepoxide are used in quantities such that the equivalent ratio of isocyanate groups to hydroxyl and/or epoxide groups is from 1.1:1 to 6:1. The chain extender is used in a quantity which is at least equivalent to the isocyanate excess (i.e. isocyanate groups which would remain after all of hydroxyl and/or epoxide groups had been reacted with isocyanate groups). The reaction is carried out in a closed or an open mold using cast-resin technology. The process of the present invention may be carried out as a one-step process or as a two-step prepolymer process.

DETAILED DESCRIPTION OF THE INVENTION

The present invention relates to a process for the production of non-foamed moldings using cast-resin technology by reaction in a closed or an open mold of (a) an organic polyisocyanate with (b) an organic polyhydroxyl compound and/or a polyepoxide in quantities such that the equivalent ratio of the isocyanate groups in component (a) to the hydroxyl and/or epoxide groups in component (b) is from 1.1:1 to 6:1. This reaction is carried out in the presence of (c) a chain-extending agent used in a quantity which is at least equivalent to the isocyanate excess resulting from the ratio of (a) to (b). Water in the form of an aqueous alkali aluminosilicate or an aqueous alkali-alkaline earth aluminosilicate of the zeolite type is used as the chain-extending agent (c).

Any polyisocyanate known to those skilled in polyurethane chemistry may be used as component (a) in the process of the present invention. Particularly suitable components (a) are 2,4- and, optionally, 2,6-diisocyanatotoluene: 4,4'-isocyanatodiphenylmethane or mixtures thereof with 2,4'-diisocyanatodiphenylmethane and/or with higher homologs thereof containing more than 2 isocyanate groups per molecule (these mixtures are produced in known manner by phosgenating aniline-formaldehyde condensates): 1,6-diisocyanatohexane: 2,4,4-trimethyl-1,6-diisocyanatohexane or 1-isocyanato-3-isocyanatomethyl-3,5,5-trimethylcyclohexane (IPDI).

Component (b) used in the process of the present invention may be any of the polyhydroxyl compounds known to those skilled in polyurethane chemistry and/or any polyepoxides containing at least two epoxide groups.

Suitable polyhydroxyl compounds include any organic polyhydroxyl compounds containing at least two primary and/or secondary alcoholic hydroxyl groups and having a molecular weight in the range from 62 to 6000 (preferably from 90 to 3000). The polyhydroxyl compounds may be simple monohydric alcohols such as ethylene glycol, 1,2-dihydroxypropane, 2,3-dihydroxybutane, 1,4-dihydroxybutane, 1,6-dihydroxyhexane, trimethylol propane or glycerol or alcohols containing ether groups, such as the alkoxylation products of the simple alcohols mentioned above (the alkoxylating agent being in particular ethylene oxide and/or propylene oxide). Suitable polyether polyols include polyethylene glycols and polypropylene glycols and propoxylation products of trimethylol propane having molecular weights of from 62 to 6000. Mixtures of different polyether polyols may of course also be used. Other polyhydroxyl compounds include the polyester polyols known to those skilled in polyurethane chemistry, for example, the reaction products of adipic acid, phthalic acid and/or hexahydrophthalic acid with excess quantities of simple polyhydric alcohols of the type mentioned above. These polyester polyols generally have a molecular weight of at most 5000. The molecular weight of the polyhydroxyl compounds mentioned may be calculated from their functionality and their hydroxyl group content. The molecular weight of the branched polyester polyols may be determined by vapor pressure osmometry. Castor oil may also be used as component (b). The polyether polyols mentioned by way of example and mixtures thereof with simple alkane polyols such as those described above having an OH-number in the range from 50 to 1000 are particularly preferred.

Instead of or in combination with the polyhydroxyl component (b), polyepoxides may be used as component (b) in the process of the present invention. In the context of this invention, polyepoxides are aliphatic, cycloaliphatic, aromatic or heterocyclic compounds which (on a statistical average) contain at least two epoxide groups per molecule. These polyepoxides preferably have an epoxide equivalent weight of from 100 to 400, more preferably from 120 to 200.

Suitable polyepoxides include polyglycidyl ethers of polyhydric phenols such as pyrocatechol, resorcinol, hydroquinone, 4,4'-dihydroxydiphenylmethane, 4,4'-dihydroxy-3,3'-dimethyldiphenylmethane, 4,4'-dihydroxy diphenyldimethylmethane, 4,4'-dihydroxy diphenylcyclohexane, 4,4'-dihydroxy-3,3'-dimethyldiphenylpropane, 4,4'-dihydroxy diphenyl, 4,4'-dihydroxy diphenylsulfone and tris-(4-hydroxyphenyl)-methane. Other suitable polyepoxides include polyepoxide compounds based on aromatic amines and epichlorohydrin such as N,N-bis-(2,3-epoxypropyl)aniline, N,N'-dimethyl-N,N'-diepoxypropyl-4,4'-diaminodiphenylmethane, N,N,N',N'-tetraepoxypropyl-4,4'-diamino-diphenylmethane. It is also possible to use glycidyl esters of polybasic aromatic, aliphatic and cycloaliphatic carboxylic acids (for example, phthalic acid diglycidyl ester, adipic acid diglycidyl ester). Glycidyl ethers of polyhydric alcohols (for example of 1,4-butane diol, 1,4-butene diol, glycerol, trimethylol propane, pentaerythritol and polyethylene glycols) may also be used.

The following di- and polyepoxide compounds or mixtures thereof are preferably used in the process of the present invention: polyglycidyl ethers of polyhydric phenols (particularly bisphenol A); polyepoxide compounds based on aromatic amines (especially bis-(N-epoxypropyl)-aniline, N,N'-dimethyl-N,N'-bis-epoxypropyl-4,4'-diaminodiphenylmethane); and polyglycidyl esters of cycloaliphatic dicarboxylic acids (especially hexahydrophthalic acid diglycidyl ester).

The chain extender component (c) used in the process of this invention is water in the form of aqueous alkali aluminosilicates or in the form of aqueous alkali-alkaline earth aluminosilicates of the zeolite type. Synthetic zeolites (cf. Ullmanns Enzyklopadie der technischen Chemie, 4th Edition, Vol. 17, pages 9 to 18, Verlag Chemie, Weinheim/New York) are particularly suitable. In addition to Zeolite A (referred to in the Ullmanns reference), zeolites corresponding to the following formulae

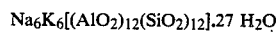

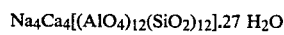

are also suitable. The zeolites used in the process of this invention preferably have a pore diameter of from 0.3 to 0.75 nm and a water content of from 4 to 12 wt. % preferably from 8 to 10 wt. %. In the context of this invention, the water content is understood to be the water content which may be gravimetrically determined after tempering at 320° C. Consequently, the zeolites actually used do not necessarily correspond in their water content to the formulae shown above. It is possible to remove some of the water shown in the formulae from the zeolites by storage in a drying cabinet (at 100° to 160° C., for example, and preferably at 120° to 140° C.) to adjust the water content to within the ranges mentioned above. The zeolites having the above-mentioned water content suitable for use in the process according to the invention may also be produced, for example, by storing a wet zeolite in a drying cabinet at 100° to 160° C. (preferably at 120° to 140° C.) until the water content measurable by the gravimetric method has fallen to a value within the range of 4 to 12 wt. %. It is also possible to heat an anhydrous zeolite at a temperature of from 100° to 160° C. in a heating cabinet until the water content has risen to a value within the ranges specified through the uptake of atmospheric moisture. It is particularly preferred to use the zeolites in powder form. It is also preferred to use the zeolites immediately after the heat treatment, i.e. to mix the zeolites with the reactants, preferably component (b), while they are still hot.

Auxiliaries and additives commonly used in cast-resin technology may of course be used in the practical application of the process of the present invention. Such auxiliaries and additives include catalysts such as tertiary amines, for example benzyldimethylamine, N,N,N',N'-tetramethyldiaminodiphenylmethane, permethyl diethylene triamine, N-methyl-N'-(2-dimethylaminoethyl)-piperazine; ether amines such as bis-(dimethylaminoethyl)-ether; and organometallic compounds such as cobalt octoate or dibutyl tin dilaurate. Mixtures of any of these catalysts may also be used.

Other appropriate auxiliaries and additives include fillers such as silicate-based fillers, quartz powder, Silitin, calcium carbonate, Mikrodol, Plastorit, aluminum oxides, magnesium oxide, titanium dioxide, kaolin or heavy spar. Reinforcing materials, such as glass fibers may also be used in the process of the present invention.

The process of the present invention may be carried out in various ways. In each of these variants, polyisocyanate component (a) and polyhydroxyl and/or polyepoxide component (b) are used in quantities such that the equivalent ratio of isocyanate groups to hydroxyl and/or epoxide groups is from 1.1:1 to 6:1, preferably from 1.2:1 to 3:1. The quantity of water, i.e. the quantity of aqueous zeolite, is measured in such a way that the water is present in at least equivalent quantities based on the NCO-excess arising out of the reaction of (a) with (b). In general, the quantity in which the aqueous zeolite is used is measured in such a way that from 0.5 to 10 moles and preferably from 0.5 to 5 moles of water present in the zeolite are available for each mole of excess NCO-groups (based on the reaction of components (a) and (b)). Once again, the water present in the zeolite is understood to be the quantity of water which may be gravimetrically determined as the weight difference after tempering at 320°.

In one embodiment of the present invention a one-step principle is used. That is, polyisocyanate component (a) is mixed with polyhydroxyl and/or polyepoxide component (b), chain-extender component (c) and the auxiliaries and additives used, if any. It is preferred that the chain extender (c) and any auxiliaries and additives used be incorporated in component (b) before component (b) is mixed with the polyisocyanate component (a). However, it is also possible to incorporate at least part of component (c) in component (a) before mixing with component (b). The reaction mixture thus obtained may be processed as a cast-resin immediately after its preparation. The moldings are preferably hardened in the absence of pressure, generally at a temperature in the range from 25° to 130° C. The pot life of the cast-resins at room temperature is generally from 15 to 60 minutes.

In a second embodiment, the process of the present invention may be carried out on the two-step principle by initially preparing a prepolymer containing free isocyanate groups from polyisocyanate component (a) and polyhydroxyl and/or polyepoxide component (b) and then mixing the prepolymer thus-prepared with chain-extender component (c) to form the ready-to-use cast-resin. In this case, the auxiliaries and additives used, if any, are preferably incorporated in the NCO-prepolymer after its preparation. The two-step principle as applied in the process according to the invention is of course confined to those cases in which the NCO-prepolymers or their mixtures with chain extender component (c) are still free-flowing.

The end products of the process of this invention are castings having a smooth, non-cellular, concave surface of the type characteristic of the surfaces formed by the reaction shrinkage which takes place during the transition from liquid to solid. The troublesome formation of $CO_2$-bubbles encountered in the prior art does not occur in the process according to the invention. In the present invention, water is added to the reaction mixture as a chemical reactant in adsorbed form (adsorbate water). The zeolite performs a dual function. It gives off the water (moisture) and takes up the carbon dioxide as reaction product. Traces of moisture present in the reactants and in the auxiliaries and additives are not troublesome. The effect obtained in accordance with this invention by which the reaction mixture is rendered immune to the moisture in the surrounding air was completely surprising and in no way foreseeable. The present invention makes it possible to produce molded plastics with specifically adjusted properties. Thus, the hardness of the molded plastics depends primarily upon the functionality and the molecular weight of the starting materials used. For example, short-chain branched polyhydroxyl and/or polyepoxide components (b) produce rigid moldings while long-chain linear synthesis components produce elastic moldings. However, it is also possible, by combining low molecular weight diol or polyol with relatively high molecular weight long-chain diol, to combine rigid segments with flexible segments in solid materials in such a way that their properties are situated between the two extremes of flexible and rigid. By introducing mineral fillers (which may even be used in hydrated form), it is possible to increase flame resistance, the formation of smokeless, non-corrosive combustion gases and also tracking-arc resistance and weather resistance. In addition, certain processing or molding properties may be influenced by the addition of suitable auxiliaries, such as flexibilizers, dyes or plasticizers.

Another advantage of the process of the present invention is that there is no need for the expensive removal of traces of water from the starting materials. Thus, the 0.2 to 0.5% of water present in the standard commercial polyols suitable for use as component (b) is generally not troublesome. Even fillers and reinforcing materials, such as hydrophilic glass fibers, do not have to be predried. Given the right formulation, even contact between the reaction mixture and water during reaction in accordance with the present invention has no harmful effects. Processing in a moist atmosphere or hardening under water are both possible without troublesome foaming.

The end products of the process of this invention are particularly useful in the electrical industry. They are suitable, for example, as insulating materials which are used as casting or embedding compositions (for example, for cable fittings). They may also be used as load-bearing insulators. In mold and template construction, they may be used as molding compositions intended to be cast and hardened in wooden molds which naturally give off moisture. When processed in wooden molds, cast-resins produced from the usual starting materials (i.e. in particular without the chain extender component (c) essential to the invention) generally give castings having a porous surface. In contrast, moldings produced in wooden molds by the process of the present invention have a homogeneous surface, particularly when hardening is started from the moist wall of the mold. This may be achieved, for example, by coating the inner wall of the wooden molds with a release agent containing a hardening catalyst. Suitable release agents are, for example, Trenmittel W 10 or Trenmittel S 10, both products of Th. Goldschmidt AG, Essen which are silicone-free, organic release agents dissolved or suspended in chlorinated hydrocarbons.

The high mechanical strength values of the products obtained by the process of this invention also enable them to be used in the production of fittings such as valve housings for pipes. Where fillers of low specific gravity (for example, those based on organic phenolic resins or on hollow glass beads) are used, it is possible to obtain moldings having a density distinctly below 1.0 g/cm$^3$.

The invention is illustrated by the following Examples in which all of the percentages quoted are percentages by weight.

EXAMPLES

The following starting materials were used in the Examples:

Isocyanate 1: 4,4'-diisocyanatodiphenylmethane.

Isocyanate 1a: An isomer mixture of 2,4'- and 4,4'-diisocyanatodiphenylmethane (ratio by weight of 2,4' to 4,4' = 60:40).

Isocyanate 1b: A polyisocyanate mixture of the diphenylmethane series having an average NCO-functionality of 2.2 and a viscosity at 25° C. of 50 mPa.s, made up of 45% of 2,4'-diisocyanatodiphenylmethane, 45% of 4,4'-diisocyanatodiphenylmethane and 10% of higher, homologous polyisocyanates of the diphenylmethane series.

Isocyanate 1c: A polyisocyanate mixture of the diphenylmethane series having an average NCO-functionality of 2.8 and a viscosity at 25° C. of 100 mPa.s, made up of 15% of 2,4'-diisocyanatodiphenylmethane, 45% of 4,4'-diisocyanatodiphenylmethane and 40% of higher polyisocyanates of the diphenylmethane series.

Isocyanate 2: A mixture of 2,2,4- and 2,4,4-trimethyl-1,6-diisocyanatohexane, viscosity at 20° C.: 5 mPa.s.

Isocyanate 3: 1-isocyanato-3-isocyanatomethyl-3,5,5-trimethylcyclohexane.

Polyol 1: Polypropylene glycol (PPG), OH content: 1.7%; viscosity at 25° C.: 340 mPa.s; water content: 0.2%.

Polyol 2: Polyethylene glycol (PEG), OH content: 9%; viscosity at 25° C.: 90 mPa.s.

Polyol 3: Polypropylene glycol, OH content: 1.24%; viscosity at 25° C.: 500 mPa.s.

Polyol 4: Propoxylated trimethylol propane, OH content: 12%: viscosity at 25° C.: 700 mPa.s.

Polyol 5: 2,3-butane diol, OH content: 38%; viscosity at 25° C.: approx. 117 mPa.s.

Polyol 6: Polypropylene glycol (PPG), OH content 3.5%; viscosity at 25° C.: 140 mPa.s, produced from 1,2-propylene glycol and propylene oxide.

Polyol 7: Propoxylated trimethylol propane, OH content: 1.7%; viscosity at 25° C.: 500 mPa.s.

Zeolite 1: Standard commercial potassium-sodium aluminosilicate of the Zeolite A type (Baylith L ® powder, a product of BAYER AG, Leverkusen), pore diameter: 0.38 nm; maximum water uptake capacity: 23% at 25° C./50% relative air humidity. The zeolite was first saturated with water at room temperature and then stored in a drying cabinet for 24 hours at 130° C. After this heat treatment, the zeolite had a water content of 8 g per 100 g of zeolite powder (the water content was determined gravimetrically by tempering at 320° C. to constant weight; the water content was calculated from the measured weight loss).

Zeolite 2: Zeolite 2 corresponded to Zeolite 1 with the sole difference being that the water-saturated zeolite powder was stored in a drying cabinet for 24 hours at 160° C. Thereafter the zeolite powder had a water content of 4 g per 100 g of powder.

Zeolite 3: Zeolite 3 corresponded to Zeolite 1, but was treated with water. The zeolite powder was dried in a drying cabinet at 350° C. to a residual water content of less than 1 g of water per 100 g of zeolite powder.

Zeolite 3P: A paste consisting of Zeolite 3 and castor oil in a ratio by weight of 1:1.

Epoxy resin 1: Diglycidyl ether of bisphenol A, epoxide equivalent weight: 180; melting point: 32°-36° C.

Epoxy resin 2: N,N-bis-(2,2-epoxypropyl)-aniline, epoxide equivalent weight: 120; viscosity at 25° C.: 110–150 mPa.s (Lekutherm ® X 50, a product of Bayer AG).

Epoxy resin 3: Diglycidyl ester of hexahydrophthalic acid, epoxide equivalent weight: 175; viscosity at 25° C.: 600–900 mPa.s (Lekutherm ® X 100, a product of Bayer AG).

Amine 1: N-methyl-N'-(N'',N''-dimethylaminoethyl)-piperazine, density at 25° C.; 0.9 g/cm$^3$; boiling range at 760 mmHg: 210°-225° C.

Amine 2: Permethyldiethylene triamine.

Amine 3: N,N,N',N'-tetramethyl-4,4'-diaminodiphenylmethane, melting point: 86°-89° C.

Amine 4: N,N-dimethylbenzylamine.

Catalyst 1: Cobalt (II) octoate.

Catalyst 2: DBTDL (Dibutyl tin dilaurate).

In the following working examples zeolites 1 through 3 were admixed with the reactants set forth in the examples immediately after the heat treatment, i.e. while they were still hot.

EXAMPLE 1

A reaction mixture was prepared by mixing the following components in a glass beaker with a stirrer at room temperature without the polyol being pre-dried by heating in vacuo.

25 g of Isocyanate 1a
100 g of Polyol 1
80 g of Zeolite 1
4 0 g of Amine 1

The NCO:OH:H$_2$O ratio was 4:2:7.

A bubble-free, solid reaction molding material of elastomeric character was obtained after hardening for 24 h at room temperature and heating for 5 h at 80° C.

| Appearance of molding material: | |
|---|---|
| Volume structure | homogeneous, solid |
| Surface | (concave) |
| Consistency | solid-elastic |

EXAMPLE 2 (tile manufacture)

A reaction mixture was prepared by mixing the components of Example 1 at room temperature without preheating in vacuo. Casting viscosity at 25° C.: 2900 mPa.s: pot life: 15 minutes.

To make a 4 mm thick tile in DIN A4 format, the reaction mixture thus prepared was cast into an aluminum mold treated with a release agent consisting of 200 parts by weight of white spirit, 100 parts by weight of Baysilonöl ® of Bayer AG, Leverkusen, Germany, 80 parts by weight of "Silicone Oil M 100" of Bayer AG, Leverkusen, Germany, 10 parts by weight of a 10% by weight solution of tin (II)-octoate in xylene and 3 parts by weight of paraffin oil, hardened for 3 h at room temperature and then heated for 24 h at 80° C. A PUR elastomer having the following properties was obtained:

| Properties of molding material: | | |
|---|---|---|
| Shore hardness A | DIN 53505 | 77 |
| Tensile strength | DIN 53504 (MPa) | 5 |
| Breaking elongation | DIN 53504 (%) | 500 |
| Shock elasticity | DIN 53512 (%) | 30 |
| Glass temperature | DIN 53445 (°C.) | −36 |

In the absence of H$_2$O in the reaction mixture, soft molding materials having breaking elongations of <100% or highly viscous liquids were obtained.

EXAMPLE 3 (One-shot/prepolymer process)

The reaction may be carried out by the one-shot process or by the prepolymer process as shown in Table 1. All of the components were mixed by stirring.

In the prepolymer process, Polyol 1 was first reacted with Isocyanate 1a and Catalyst 2 by stirring to form the prepolymer (step A). Zeolite 1 and Amine 1 were then added and stirring continued (step B).

The molding materials obtained had comparable properties.

TABLE 1

| (quantities in g) | | | | |
|---|---|---|---|---|
| | | Prepolymer | | |
| | One-shot | A | B | Process |
| Composition: | | (OH:NCO:H$_2$O = 2:4:5) | | |
| Polyol 1 | 100 | 100 | — | |
| Isocyanate 1a | 25 | 25 | — | |
| Zeolite 1 | 50 | — | 50 | |
| Amine 1 | 0.1 | — | 0.1 | |
| Catalyst 2 | 0.2 | 0.2 | — | |
| Reaction mixture | 175.3 | 125.2 | 50.1 | |

TABLE 1-continued

| | (quantities in g) | | | |
|---|---|---|---|---|
| | | Prepolymer | | |
| | One-shot | A | B | Process |
| | | 175.3 | | |
| Hardening | 60° C./16 h + 100° C./1 h | | | |
| Properties of the molding materials: | | | | |
| Shore hardness A | DIN 53505 | 86 | 78 | |
| Tensile strength MPa | DIN 53504 | 6 | 7 | |
| Breaking elongation % | DIN 53504 | 400 | 400 | |
| Shock elasticity % | DIN 53512 | 32 | 30 | |

EXAMPLE 4 (variation of the isocyanate components)

Reaction mixtures were prepared by mixing 100 g of polyol with the following isocyanates:

| | |
|---|---|
| 25 g of Isocyanate 1a | (aromatic MDI) or |
| 33 g of Isocyanate 2 | (aliphatic TMDI) or |
| 30 g of Isocyanate 3 | (cycloaliphatic IPDI) |

Whereas Isocyanates 1a and 2 were best mixed with the catalyst mixture by the one-shot process with addition of Zeolite 1, Isocyanate 3 is best processed on the prepolymer principle by initially pre-reacting Polyol 1 and Isocyanate 3 at 100° C. and then reacting Zeolite 2 together with the catalyst mixture. All three reactions were carried out without Polyol 1 being Pre-dried. Hardening at room texperature was followed by tempering for 24 h at 80° C. The composition of the reaction mixtures and the properties obtained are shown in Table 2. The reaction molding materials show favorable elastomer properties.

TABLE 2

| Composition (quantities in g) | | | |
|---|---|---|---|
| Polyol 1 | 100 | 100 | 100 |
| Isocyanate 1a | 25 | — | — |
| Isocyanate 2 | — | 33 | — |
| Isocyanate 3 | — | — | 30 |
| Zeolite 1 | 50 | 100 | — |
| Zeolite 2 | — | — | 80 |
| Catalyst 1 | — | 0.3 | 0.2 |
| Amine 1 | 4.0 | 0.6 | 0.2 |
| NCO:OH:H$_2$O | 4:2:5 | 6:2:4.5 | 5.3:2:3.6 |
| Properties | | | |
| Shore-A | 62 | 60 | 74 |
| DIN 53505 | | | |
| Tensile strength MPa | 4 | 4 | 5 |
| Breaking elongation % | 700 | 800 | 850 |
| DIN 53504 | | | |
| Shock elasticity % | 25 | 21 | 30 |
| DIN 53512 | | | |
| Glass temperature °C. | −40 | −45 | −48 |
| DIN 53445 | | | |

EXAMPLE 5 (Effect of functionality on the properties of molding materials)

A mixture of 300 g of Polyol 1, 150 g of Zeolite 1 and 15 g of kaolin as sedimentation inhibitor together with Amine 1 and Catalyst 1 was divided into 3 equal parts. 25 g of Isocyanate 1a, 25 g of Isocyanate 1b and 25 g of Isocyanate 1c were respectively added to and reacted with parts 1, 2 and 3. The reaction mixtures were then cast into tile molds. The test specimens were hardened for 24 h at 80° C. and cut out. Their mechanical properties are shown in Table 3.

TABLE 3

| Effect of MDI functionality Composition (quantities in g): | | | |
|---|---|---|---|
| Functionality | 2.0 | 2.2 | 2.8 |
| Polyol 1 | 100 | 100 | 100 |
| Isocyanate 1a | 25 | — | — |
| Isocyanate 1b | — | 25 | — |
| Isocyanate 1c | — | — | 25 |
| Zeolite 1 | 50.0 | 50.0 | 50.0 |
| Kaolin | 5.0 | 5.0 | 5.0 |
| Amine 1 | 4.5 | 4.5 | 4.5 |
| Catalyst 1 | | | |
| Content of binuclear MDI | 100% | 90% | 60% |
| Hardening 24 h/80° C. | | | |
| Properties of molding materials | | | |
| Shore hardness | A-62 | A-60 | A-68 |
| DIN 53505 | | | |
| Tensile strength MPa | 4 | 3 | 3 |
| DIN 53504 | | | |
| Breaking elongation % | 720 | 112 | 62 |
| DIN 53504 | | | |
| Shock elasticity % | 25 | 27 | 23 |
| DIN 53512 | | | |
| Glass temperature °C. | −38 | −36 | −38 |
| DIN 53445 | | | |

EXAMPLE 6 (Variation of the molecular weight of the diol)

Reaction mixtures were prepared by mixing Isocyanate 1a with various polyols on the one-shot principle in the presence of Zeolite 1 or Zeolite 2 without preheating in vacuo. The reaction mixtures thus prepared crosslinked with catalyst mixtures at 80° C./24 h and 100° C./24 h to form PUR elastomers having different mechanical properties depending upon the polyol used. The composition and properties are shown in Table 4.

TABLE 4

| | 1 | 2 | 3 | 4 |
|---|---|---|---|---|
| Composition (quantities in g) | | | | |
| Polyol 2 | 100 | — | — | — |
| Polyol 6 | — | 100 | — | — |
| Polyol 1 | — | — | 100 | — |
| Polyol 3 | — | — | — | 100 |
| Isocyanate 1 | 75 | 40 | 25 | 20 |
| Zeolite 1 | — | 40 | 50 | 50 |
| Zeolite 2 | 60 | — | — | — |
| Catalyst 1 | — | — | — | 0.2 |
| Catalyst 2 | — | 0.2 | — | — |
| Amine 1 | — | 1.0 | — | — |
| Amine 2 | — | — | 0.18 | 4 |
| Reaction ratio | | | | |
| NCO:OH:H$_2$O | 12:10:2.6 | 6:4:3.6 | 4:2:5 | 4:2:5 |
| Properties | | | | |
| Shore A | 79 | 65 | 72 | 64 |
| DIN 53505 | | | | |
| Tensile strength MPa | 20 | 5 | 4 | 3 |
| DIN 53504 | | | | |
| Breaking elongation % | 380 | 550 | 570 | 140 |
| DIN 53504 | | | | |
| Shock elasticity % | 8 | 7 | 35 | 35 |
| DIN 53512 | | | | |
| Glass temperature °C. | +8 | — | −36 | −47 |
| DIN 53445 | | | | |

EXAMPLE 7 (diol mixtures)

100 g of Polyol 1 were mixed as shown in Table 5 with various quantities (0, 10, 20, 40 g) of Polyol 5 and the resulting mixtures homogenized by stirring with Isocyanate 1a and Zeolite 2 without preheating in vacuo to form reaction mixtures. Reaction molding materials having increasing mechanical strength values were obtained after hardening in metal tile molds. With increasing quantities of Polyol 5, the Martens temperature increased from <R.T. to +100° C. The molding materials had a segmented structure. With decreasing contents of rigid segments, tensile strength decreased from 60 to 4 MPa while breaking elongation increased commensurately from 2% to 500%.

TABLE 5

| Composition (quantities in g) | | | | |
|---|---|---|---|---|
| Isocyanate 1a | 25 | 80 | 136 | 247 |
| Polyol 1 MW 2000 | 100 | 100 | 100 | 100 |
| Polyol 5 MW 90 | 0 | 10 | 20 | 40 |
| Zeolite 2 | 50 | 120 | 180 | 300 |
| Amine 1/Catalyst 1 | 0.13/0.2 | — | — | — |
| Reaction ratio | | | | |
| NCO:OH:H₂O | 4:2:5 | 4:2:1.8 | 4:2:1.6 | 4:2:1.5 |
| Hardening conditions | 24 h 80° C. | 24 h/80° C. + 2 h/130° C. | | |
| Properties | | | | |
| Martens dimensional stability °C. DIN 53458 | R.T. | R.T. | 44 | 100 |
| Flexural strength MPa DIN 53452 | 0.3 | 10 | 60 | 110+ |
| Impact strength kJ/m² DIN 53453 | breaks | breaks | 20 | 13 |
| Tensile strength MPa | 4 | 20 | 40 | 60 |
| Breaking elongation % DIN 53504 | 500 | 70 | 11 | 2 |

EXAMPLE 8 (hardening in various ambient media)

A reaction mixture made up of 100 g of Polyol 1, 25 g of Isocyanate 1a, 50 g of Zeolite 1 and 5 g of kaolin as sedimentation inhibitor, catalyzed as shown in Table 6, was cast without pretreatment in 4 mm and 2 mm thick layers in DIN A4 molds of mirror-smooth cast iron treated with release agents. Hardening took place in contact with the following ambient media: (1) moist air at 23° C./100% relative humidity: (2) under water in a tank; and (3) in the laboratory at 23° C./50% relative air humidity. The tiles hardened without foaming. After removal from their molds, they were hardened at 80° C. For comparable shock elasticity and glass temperature, the tiles showed good tensile strength and breaking elongation (>100%). In comparison, when Zeolite 1 was replaced by Zeolite 3, the tile formed had a surface layer of foam.

TABLE 6

| Reaction ratio: NCO:OH:H₂O = 4:2:5 (quantities in g) | | | |
|---|---|---|---|
| Polyol 1 | 100 | 100 | 100 |
| Isocyanate 1a | 25 | 25 | 25 |
| Zeolite 1 | 50 | 50 | 50 |
| Kaolin | 5 | 5 | 5 |
| Amine 1 | 4 | 4 | 2 |
| Catalyst 1 | 0.2 | 0.2 | 0.45 |
| Preparation: | no preheating in vacuo | | |
| Ambient medium during hardening | Laboratory air 23° C./50% r.H* | moist air 23° C./100% r.H* | under water 20° C. |
| Oven tempering | 4 h/80° C. | 16 h/80° C. | 4 h/80° C. |
| Properties | | | |
| Shore hardness A DIN 53505 | 62 | 64 | 85 |
| Tensile strength MPa DIN 53504 | 4 | 3 | 5 |
| Breaking elongation % | 723 | 265 | 600 |

TABLE 6-continued

| DIN 53504 | | | |
|---|---|---|---|
| Shock elasticity % DIN 53512 | 25 | 24 | 26 |
| Glass temperature °C. DIN 53445 | −35 | −36 | −36 |

*r.H = relative humidity

EXAMPLE 9 (composite materials)

A more or less unbroken film of water forms on glass surfaces. These films of water are expensive to remove in terms of time and energy. Since moisture does not cause problems through bubble formation in the process of the present invention, it is possible to incorporate glass fibers in the reaction mixture both in cloth form and also in the form of short fibers without any need for pretreatment. Using the reaction mixture of Example 2, a laminate containing 60% of glass was built up by multiple coating. Up to 70% of short glass fibers were stirred into the reaction mixture of Example 2. The reaction molding materials could be hardened at 60° and 80° C. without pre-drying to form 2 mm thick and 4 mm thick tiles. The molding materials showed good elastomer properties (Table 7).

TABLE 7

| | Binder | Glass Laminate | Glass Fiber |
|---|---|---|---|
| Composition: NCO:OH:H₂O = 4:2:5 (quantities in g) | | | |
| Isocyanate 1a) | 25 | 25 | 25 |
| Polyol 1 | 100 | 100 | 100 |
| Kaolin | 5 | 5 | 5 |
| Zeolite 1 | 50 | 50 | 50 |
| Amine 1 | 0.13 | 0.13 | 0.13 |
| Catalyst 1 | 0.2 | 0.2 | 0.2 |
| Number of coats to 4 mm | — | 16 | — |
| Short glass fiber content % | — | — | 70 |
| Preparation | no preheating in vacuo | | |
| Hardening | 16 h/60° C. + 4 h/80° C. | | |
| Properties of the molding materials | | | |
| Glass fiber content % | 0 | 61 | 70 |
| Shore hardness DIN 53505 | A-72 | — | A-75 |
| Martens temperature °C. DIN 53458 | RT | 46 | RT |
| Flexural strength MPa DIN 53452 | 0.3 | 32 | 0.6 |
| Peripheral fiber % elongation | 3.5 | 6 | 3.5 |
| Impact strength 23° C. kJ/m² DIN 53453 −30° C. | — | 55 | — |
| Tensile strength MPa DIN 53504 | 4.6 | 72 | 3 |
| Breaking elongation % DIN 53504 | 400–600 | 1.6 | 280 |
| Coefficient of thermal expansion VDE 0304/1 10⁻⁶ K⁻¹ | — | 0–3 | 90 |
| Glass temperature °C. DIN 53445 | −38 | — | −34 |

EXAMPLE 10 (branched polyols [triols] give tough and rigid PUR)

100 g of Polyol 4 were hardened with increasing quantities of Isocyanate 1a, as shown in Table 8, with addition of Zeolite 1 and Amine 1. Molding materials having increasing Martens temperatures, corresponding to the increasing degree of crosslinking (Table 8) were obtained from 4 mm tile molds treated with release agents without preheating of the reactants in vacuo.

When Zeolite 1 was replaced by Zeolite 3 in the reaction mixtures, the molding materials obtained did not have sufficient Martens temperatures despite preheating in vacuo (columns 1 and 2). The tiles obtained with a large excess of NCO and in the absence of absorbate water were heterogeneous with internal bubbles and surface shrinkage holes (frosting, pinholes). Satisfactory test specimens could not be prepared (column 5).

obtained were inhomogeneous with bubbles. Test specimens gave low Martens temperatures (below 100° C.). Despite pretreatment in vacuo, the inhomogeneous test specimens gave dielectric strengths of 12 kV/mm. The homogeneous test specimens produced by the process of the present invention gave approx. 50% better values (17 kV/mm) without preheating in vacuo (for further details, see Table 9).

At molar ratios of NCO to epoxide of 4:1 and 6:5,

TABLE 8

| Example 10: branched polyol with diisocyanate | | | | | |
|---|---|---|---|---|---|
| | Column | | | | |
| | 1 | 2 | 3 | 4 | 5 |
| Composition (parts by weight) | | | | | |
| Polyol 4 | 100 | 100 | 100 | 100 | 100 |
| Isocyanate 1a | 100 | 100 | 100 | 167 | 167 |
| Zeolite 1 | — | — | 50 | 100 | — |
| Zeolite 3 | 10 | 50 | — | — | 100 |
| Amine 1 | — | — | 1.2 | — | — |
| Amine 4 | — | 0.5 | — | — | 1.5 |
| Quartz powder | — | — | — | — | — |
| NCO:OH:H$_2$O | 14:12:0 | 14:12:0 | 14:12:4 | 12:6:4.5 | 12:6:0 |
| Vacuum pretreatment | yes | yes | no | no | yes |
| Hardening conditions | 1 h room temperature to 60° C. + 24 h/80° C. | | | | |
| Properties | | | | | |
| Martens temperature (°C.) DIN 53458 | 60 | 57 | 70 | 100 | heterogeneous |
| Flexural strength (MPa) DIN 53452 | 114 | 108 | 111 | 133 | shrinkage holes |
| Impact strength (kJ/m$^2$) DIN 53453 | 30 | 12 | 11 | 20 | foaming bubble formation |

EXAMPLE 11 (poly-(oxazolidone)-urea resins)

molding materials showing favorable properties were obtained with Zeolite 1 and Zeolite 2 (Table 10).

TABLE 9

| | Comparison Examples | | | | | | |
|---|---|---|---|---|---|---|---|
| Composition | 1 | 2 | 3 | 4 | 5 | 6 | 7 |
| Epoxy resin 1 | 70 | 70 | 70 | 70 | 70 | — | — |
| Epoxy resin 2 | — | — | — | — | — | 50 | — |
| Epoxy resin 3 | — | — | — | — | — | — | 70 |
| Isocyanate 1a | 100 | 100 | 100 | 100 | 100 | 100 | 100 |
| Amine 2 | 0.2 | 0.2 | 0.2 | 0.4 | 0.4 | 0.4 | 0.4 |
| Dolomite powder | — | 150 | — | — | — | — | — |
| Zeolite 1 | — | — | — | 100 | 150 | 100 | 100 |
| Zeolite 3P | — | — | 10 | — | — | — | — |
| Reaction ratio | | | | | | | |
| NCO:EP:H$_2$O | 4:2:0 | 4:2:0 | 4:2:0 | 4:2:2.2 | 4:2:3 | 4:2:2.1 | 4:2:2.2 |
| Preheating in vacuo | yes | yes | yes | no | no | no | no |
| Hardening conditions | 4 h/80° C. and 24 h/130° C. | | | | | | |
| Martens temperature DIN 53458 °C. | 67 | 96 | 79 | 125 | 157 | 136 | 140 |
| Flexural strength DIN 53452 MPa | 65 | 48 | 106 | 95 | 110 | 140 | 120 |
| Impact strength DIN 53453 kJ/m$^2$ | 3 | 1 | 5 | 8 | 5 | 11 | 7 |
| Dielectric strength IEC 243 kV/mm | 11 | — | 13 | 17 | — | — | — |
| Structure | inhomogeneous | blisters/bubbles | | homogeneous | | | |

Reactive epoxy resins were reacted while stirring with isocyanate for 4 hours at 100 to 130° C in the quantities indicated in Table 9 (equivalent ratio of isocyanate to epoxide 2:1). Liquid polyoxazolidone isocyanates were formed. The reaction mixture was cooled to room temperature. After the addition of amine catalysts and Zeolite 1 in the quantities indicated, the reaction mixture was ready for casting.

The mixture was cast for hardening in DIN A4 tile molds and then hardened for 24 hours at 23° C. 80° C. and 130° C. Where the process of the present invention was carried out using Zeolite 1, homogeneous molding materials having good mechanical properties were obtained (columns 4 to 7). They were also obtained when the reaction was carried out by the one-shot process. In contrast, where Zeolite 3P (column 3), dried dolomite powder (column 2) or only amine catalyst (column 1) was used after preheating in vacuo, the molded tiles

TABLE 10

| | 1 | 3 |
|---|---|---|
| Composition in g | | |
| Epoxy resin 1 | 40 | 120 |
| Isocyanate 1a | 100 | 100 |
| Amine 4 | — | 1.8 |
| Amine 2 | 0.5 | — |
| Zeolite 1 | 100 | — |
| Zeolite 2 | — | 72 |
| Reaction ratio | | |
| NCO:EP:H$_2$O | 8:2:4.5 | 12:10:2.4 |
| Preheating in vacuo | no | no |
| Hardening conditions | 23° C./4 h and | 130° C./24 h |
| Properties | | |
| Martens temperature °C. DIN 53458 | 157 | 155 |
| Flexural strength MPa DIN 53452 | 140 | 120 |

TABLE 10-continued

|  | 1 | 3 |
|---|---|---|
| Impact strength kJ/m² DIN 53453 | 11 | 8 |

EXAMPLE 12 (hardening in wooden molds (molding compositions))

A 30×20×3 cm tile mold was assembled from plywood panels and battens and treated with a commercial wax-based release agent to which 3% of Amine 1 had been added. After homogenization at room temperature, the mixture according to the present invention made up of 500 g of Polyol 4, 50 g of Zeolite 3P, 500 g of Zeolite 1, 0.6 g of Amine 1 and 500 g of Isocyanate 1b was introduced into the mold and hardened for 24 h at room temperature. The tile formed was free from foam on the surfaces facing the wooden mold. EXAMPLE 13 (cable sealing)

Two test specimens with an electrode arrangement for a 1 minute test voltage were prepared as described in DIN 57291/2-VDE 0291/2, 6.8. These model joint boxes were used for determining the 1 minute holding voltage between 20 mm diameter ball electrodes separated by a 2 mm gap.

The reaction mixture according to the present invention was prepared by stirring 700 g of Polyol 1, 490 g of Zeolite 1, 0.85 g of Amine 1 and 175 g of Isocyanate 1a at room temperature and was then divided into 2 aliquots.

The first half was poured into the dry joint box and the second half into the joint box previously filled with water, so that displacement sealing took place. The sealing compound of higher specific gravity sank to the bottom and displaced the water so that the ball electrodes were completely embedded. Hardening took place for 24 hours at room temperature.

No foaming took place at the resin/water interface either during casting or during hardening. After hardening, voltage was applied: 10 kV for 1 minute and then 20 kV for another minute. Both voltages were held.

In a comparison test, another two joint boxes were similarly sealed with a conventionally prepared sealing compound. 500 g of Polyol 4, 500 g of Polyol 7, 6 g of Amine 4 and 100 g of Zeolite 3P as polyol component were preheated at 60° C. in a vacuum of 2 mbar until no more bubbles ascended. After cooling to room temperature, the polyisocyanate component (500 parts by weight of Isocyanate 1c) was mixed in at normal temperature and pressure. Both the dry and the wet joint box were filled with the mixture. The water was displaced from the water-filled box by the resin. After hardening for 24 hours at room temperature, the surface of the wet joint box showed bubble formation. Whereas the dry joint box withstood the test voltages of 10 kV and 20 kV for 1 minute each, the wet joint box broke down at 6 kV when the voltage was increased. The holding voltage of 10 kV was not reached.

The sealing compound produced by the process according to the present invention showed the feature characteristic of the invention that is, immunity of the polyether-polyurethane-polyurea composition to water which, in practice, can penetrate as rain water or ground water into the respective halves of the joint box before sealing.

EXAMPLE 14 (lightweight materials)

A polyol component was prepared by stirring 100 g of Polyol 4, 10 g of hollow beads and 0.25 g of Amine 1 at room temperature. The hollow beads were phenolic resin beads (Phenolic Plastic B10 0930 of Union Carbide, New York). The isocyanate component used was a mixture of 100 parts by weight of Isocyanate 1a, 50 parts by weight of Zeolite 1 and 35 parts by weight of hollow beads. After the reactants had been mixed, the reaction mixture had a pot life of 10 minutes. It was poured into 10 mm metal tile molds, hardened at room temperature and then tempered for 16 hours at 60° C. After removal from the mold, the tile showed a concave surface along the edge facing the air during casting and fracture surfaces of non-foamed structure.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of area modified bubble-free non-foamed moldings in which
   (a) an organic polyisocyanate is reacted in a closed or open mold using cast-resin technology with
   (b) an organic polyhydroxyl compound and/or a polyepoxide in the presence of
   (c) a water chain extender in the form of water adsorbed on either an alkali aluminosilicate or an alkali - alkaline earth aluminosilicate of the zeolite type, the water content based on the weight of said aluminosilicate being from about 4 to about 12 percent in which the equivalent ratio of isocyanate groups in Component (a) to the hydroxyl and/or epoxide groups in Component (b) is from 1.1:1 to 6:1 and the water in (c) is present in a quantity which is at least equivalent to the isocyanate excess.

2. The process of claim 1 in which the chain extender (c) is added to Component (a) and/or to Component (b) prior to the reaction of Component (a) with Component (b).

3. The process of claim 2 in which the reaction of Component (a) with Component (b) is carried out by a one-step process.

4. The process of claim 1 in which a prepolymer containing free isocyanate groups is formed from Components (a) and (b) which prepolymer is subsequently reacted with chain-extender (c).

5. The process of claim 1 in which the reaction is carried out in the presence of a catalyst and/or a filler and/or a reinforcing material and/or a flexibilizer and/or a dye and/or a plasticizer.

6. A urea-modified bubble-free molding based on a polyisocyanate-polyaddition product having improved mechanical properties obtained by reacting
   (a) an organic polyisocyanate with
   (b) a polyhydroxyl compound and/or polyepoxide in the presence of
   (c) a water chain extender in the form of water adsorbed on either an alkali aluminosilicate or an alkali - alkaline earth aluminosilicate of the zeolite type, the water content based on the weight of said aluminosilicate being from about 4 to about 12 percent and, optionally,
   (d) a catalyst and/or a filler and/or a reinforcing material and/or a flexibilizer and/or a dye and/or a plasticizer in a mold in quantities such that the equivalent ratio of isocyanate groups in (a) to the hydroxyl and/or epoxide groups in (b) is from 1.1:1 to 6:1 and the quantity of water in (c) is at least equivalent to the excess of isocyanate groups.

* * * * *